United States Patent
Sakai

(10) Patent No.: US 7,300,699 B2
(45) Date of Patent: Nov. 27, 2007

(54) ADHESIVE AND PRESSURE-SENSITIVE TRANSFER ADHESIVE TAPE

(75) Inventor: Naohito Sakai, Ichikawa (JP)

(73) Assignee: Tombow Pencil Co., Ltd., Tokyo (JP)

( * ) Notice: Subject to any disclaimer, the term of this patent is extended or adjusted under 35 U.S.C. 154(b) by 74 days.

(21) Appl. No.: 11/022,136

(22) Filed: Dec. 23, 2004

(65) Prior Publication Data

US 2005/0158540 A1    Jul. 21, 2005

(30) Foreign Application Priority Data

Jan. 14, 2004    (JP) .......................... 2004-007009

(51) Int. Cl.
*C09J 7/02*    (2006.01)
*C09J 9/00*    (2006.01)
*C09J 11/02*    (2006.01)

(52) U.S. Cl. .................. 428/343; 428/354; 428/914; 503/205

(58) Field of Classification Search .......... 428/343, 428/914, 354; 503/205
See application file for complete search history.

(56) References Cited

U.S. PATENT DOCUMENTS

| | | | | |
|---|---|---|---|---|
| 4,663,641 A | * | 5/1987 | Iiyama et al. | 503/204 |
| 4,864,024 A | * | 9/1989 | Sato et al. | 544/35 |
| 5,154,972 A | * | 10/1992 | Mizutani | 428/321.5 |
| 5,236,885 A | * | 8/1993 | Tanimoto | 503/201 |
| 5,284,689 A | * | 2/1994 | Laurash et al. | 428/41.6 |
| 5,994,246 A | * | 11/1999 | Denry | 501/32 |
| 6,544,925 B1 | * | 4/2003 | Prusik et al. | 503/201 |
| 2005/0158540 A1 | * | 7/2005 | Sakai | 428/349 |

FOREIGN PATENT DOCUMENTS

| | | |
|---|---|---|
| JP | 01 271283 | 10/1989 |
| JP | 08-027433 | 1/1996 |
| JP | 10 268772 | 10/1998 |
| JP | 03 261840 | 9/2003 |
| JP | 03 292932 | 10/2003 |

OTHER PUBLICATIONS

European Search Report dated Oct. 13, 2006.

* cited by examiner

*Primary Examiner*—Daniel Zirker
(74) *Attorney, Agent, or Firm*—Scott D. Wofsy; Edwards Angell Palmer & Dodge LLP

(57) ABSTRACT

An adhesive and a pressure-sensitive transfer adhesive tape formed by coating the adhesive on a base material are provided. The adhesive has a color when applied to a substrate and, after application can be decolored. The adhesive comprises a colored material colored by reacting a leuco dye with a developer, a material (decoloring material) having a decoloring effect by acting on the colored material, and microcapsules including a material allowing both of the colored and decoloring materials to react by acting on at least one of them.

9 Claims, 1 Drawing Sheet

ADHESIVE AND PRESSURE-SENSITIVE TRANSFER ADHESIVE TAPE

The present invention relates to an adhesive and a pressure-sensitive transfer adhesive tape coated with the adhesive on a base material, in particular to an adhesive and a pressure-sensitive transfer adhesive tape having a color when the adhesive is transferred to a substrate.

BACKGROUND OF THE INVENTION

Among double-faced adhesive tapes, there is a core-free double-faced adhesive tape in which only an adhesive layer having no core substance is transferred to a substrate. Such tape is employed in various fields and applications as a pressure-sensitive transfer adhesive tape. Many of them have a construction such that an adhesive layer provided on one face of a liner or a base material and adapted to be peeled off therefrom is wound in a roll. Recently, mainly for office applications, a transfer device in which the adhesive layer wounded in a small roll and housed in a transfer device became known. The transfer device comprises a supply reel for winding a pressure-sensitive transfer adhesive tape, an application head for transferring an adhesive layer of the pressure-sensitive transfer adhesive tape supplied from the supply reel by peeling the adhesive layer off a base material onto a substrate, and a taking-up reel for taking up the base material remaining after the transfer operation. These components are disposed in a casing that can be held and operated by one hand. There are many advantages involved with such devices over a use of liquid or solid glues, in that e.g. hands are not spoiled, the adhesive is transferred easily to a substrate, a time of drying until adhesion is obtained is not required, and the paper, i.e. the substrate, will be free from any wrinkle. Further, these devices are very convenient in that the adhesive layer can be cut by taking up or shaking off the transfer device from the substrate after transfer of a necessary length of the adhesive to the substrate thereby making it unnecessary to cut a tape previously in a required length as is the case with conventional double-faced tapes having a core, and in that no residual materials are generated because the remaining base material after transfer of the adhesive layer is wound up by the taking-up reel in the transfer substrate.

However, since the pressure-sensitive transfer adhesive tape is colorless and transparent, it is difficult to confirm the transferred adhesive and recognize a portion where it is transferred when paper or the like is to adhered thereto.

Therefore, in the JP-A-8-27433 a pressure-sensitive transfer adhesive tape having a color by incorporating a colored material in the adhesive has already been proposed. However, this generates the disadvantage that the colored adhesive while it can be confirmed upon adhering a paper or the like, the adhered portion can be seen through.

SUMMARY OF THE INVENTION

It is an object of the present invention to provide an adhesive by which the above-mentioned disadvantage is overcome. It is another object of the present invention to provide a pressure-sensitive transfer adhesive tape having a layer of an adhesive on a base material, by which the above-mentioned disadvantage is overcome, which is suitable for use in adhesive tape transfer devices of a type above-described.

These and other objects are achieved according to one aspect of the present invention by an adhesive comprising a colored material colored by reacting a leuco dye with a developer, and a material (decoloring material) having a decoloring effect when acting on the colored material, and a material allowing both of the colored and decoloring materials to react, said allowing material being provided in micro-encapsulated form.

By means of the invention the initially colored adhesive can be decolored after lapse of time by applying a pressure thereto as an external stimulus.

According to another aspect of a the invention there is provided a pressure-sensitive transfer adhesive tape provided with a layer comprising an adhesive on a base material, in which the layer comprises an adhesive comprising a colored material colored by reacting a leuco dye with a developer, a material (decoloring material) having a decoloring effect when acting on the colored material, and a material allowing both of the materials to react by acting on at least one of these materials, said allowing material being provided in micro-encapsulated form.

Each of the colored material, the decoloring material, and the allowing material can be contained in a same layer or layers different from one another, respectively.

Thus in accordance with another aspect of the invention there is provided a pressure-sensitive transfer adhesive tape having at least two layers comprising an adhesive on a base material, in which one of the layers comprises at least one material selected from a group comprising a colored material colored by reacting a leuco dye with a developer, a material (decoloring material) having a decoloring effect when acting on the colored material, and a material allowing both of said materials to react by acting on at least one of them, said allowing material being provided in micro-encapsulated form wherein the other layer comprises the material or materials not contained in said one layer.

With each of the above-mentioned aspects of the invention the allowing material is included in microcapsules adapted to be destroyed by applying a pressure thereto.

In accordance with another aspect of the present invention there is provided a pressure-sensitive transfer adhesive tape which comprises microcapsules including a material (decoloring material) having a decoloring effect by acting on a colored material colored by reacting a leuco dye with a developer and said colored material being provided in the microcapsule wall and colored by reacting a leuco dye with a developer.

For destroying the microcapsules, there may be applied thereto pressure, and/or heat, and/or irradiation of light as a stimulus. In particular, in a pressure-sensitive transfer adhesive tape according to an embodiment of the invention the microcapsules can be destroyed by applying thereto a pressure of 10000 kPa or less.

According to the present invention, the adhesive is decolored by destruction of the microcapsules contained in the adhesive by the application of a pressure exerted when the adhesive is applied or a pressure resulting by pressing on a portion where the adhesive is applied by means of a finger or the like to allow the contents of the microcapsules to be set free so that the colored material can react with the decoloring material. That is, according to the invention, a portion where the adhesive is applied can be identified easily, and the color is decolored to become colorless after lapse of a certain period of time after contacting the colored material with the decoloring material. There is no decrease of the adhesive force, i.e. the adhesive force remains on a level similar like that of a conventional adhesive.

As a summary, the adhesive and the pressure-sensitive transfer adhesive tape according to the invention is colored when using it and becomes decolored after lapse of a certain period of time, therefore it is extremely effective for joining papers or the like without the initial color affecting the appearance of the portions of the papers where the adhesive has been applied.

BEST MODE FOR CARRYING OUT THE INVENTION

Figure 1:
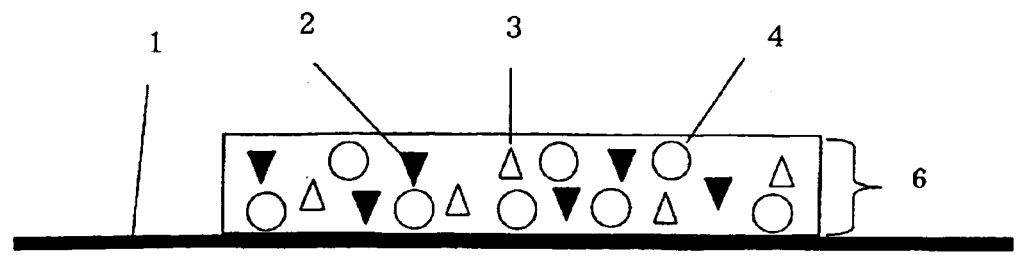
FIG. 1 is a schematic view of a pressure-sensitive transfer adhesive tape according to the present invention pursuant to Example 1.
Figure 2:
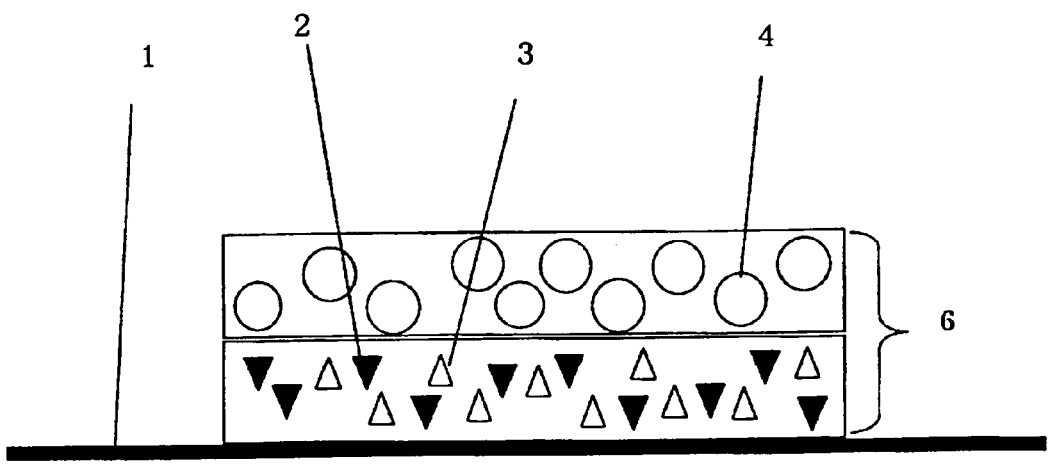
FIG. 2 is a schematic view of a pressure-sensitive transfer adhesive tape according to the present invention pursuant to Example 2.
Figure 3:
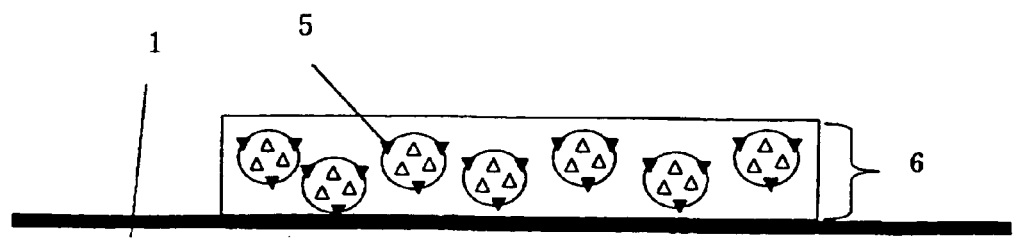
FIG. 3 is a schematic view of a pressure-sensitive transfer adhesive tape according to the present invention pursuant to Example 3.

The invention will be described in more detail hereinafter.

The adhesive itself which can be used for the invention is not different from conventional ones. For example, it is constituted by containing rubber substances such as synthetic rubber or natural rubber, or polymers or copolymers such as acrylic acid alkyl esters, acrylic acid alkyl ethers or acrylic acid vinyl ethers independently or as a mixture of two kinds or more of them as the adhesive main component, and being compounded suitably with an auxiliary agent such as a cross-linker, a tuckifier, a plasticizer, an age resister, a filler, a thickener, a pH adjuster or an antifoamer.

The adhesive may be selected in consideration of materials for use in the invention or functions to be exhibited described below.

For example, when an adhesive comprising a colored material colored by reacting a leuco dye with a developer is to be obtained, a selection of an adhesive containing a solvent capable of dissolving the leuco dye and the developer will improve the workability to obtain a colored adhesive layer.

Alternatively, a selection of an adhesive not containing a solvent capable of dissolving or swelling the wall of a microcapsule incorporated in the adhesive will make it possible to contain a microcapsule being destroyed by an application of a relatively low pressure of e.g. about 2000 kPa.

Leuco dyes for use in the invention include, for example, fluorane-series dyes represented by 3-dimethylamino-6-methoxyfluorane, 2-anilino-3-methyl-6-pyrrolidine-fluorane and the like, lactone-series dyes represented by crystal violet lactone (CVL), malachite green lactone and the like, and the like. They may be used independently or in a mixture of two or more thereof.

Developers for use in the invention include a phenolic compound such as bisphenol A, an organic sulfone compound such as bis-(3-allyl-4-hydroxyphenyl)-sulfone, and the like. They may be used independently or in a mixture of two or more thereof.

Decoloring materials for use in the invention are not particularly limited, but can be used by arbitrarily using those publicly known. They may be a material capable of decoloring the aforementioned colored material formed by the leuco dye and the developer, including polyhydric alcohols, fatty esters, glycol ethers, vegetable oils, amine compounds and the like. Specifically, polyethylene glycol, ricinus, (dimethylamino)pyridine and the like are included.

As for the material for use in the invention that can allow the colored material colored by reacting a leuco dye with a developer and the material (decoloring material) having a decoloring effect by acting on the colored material to react by acting on at least one of them, a material that can dissolve at least one of them is preferable. For example, hydrophobic liquids such as natural oils or synthetic oils used in a color former microcapsule for a pressure-sensitive copying paper and general organic solvents can be mentioned. Specific examples include cottonseed oil, kerosene, naphthene oil, paraffin, alkylated naphthalene, alkylated biphenyl, alkylated terphenyl, diarylalkane, chlorinated paraffin, dibasic esters such as phthalate ester, isopropyl alcohol, ethyl acetate, toluene and the like. They can be used independently or in a mixture of two or more thereof.

A wall membrane material for forming a microcapsule including a material allowing to react the aforementioned colored material colored by reacting a leuco dye with a developer with a material (decoloring material) having an decoloring effect by acting on at least one of them, or a microcapsule including the aforementioned material (decoloring material) having an decoloring effect by acting on the colored material colored by reacting a leuco dye with a developer and comprising the colored material colored by reacting a leuco dye with a developer in the capsule wall is not particularly limited, but can include, as specific examples, gelatin, casein, polyvinyl alcohol, nylon, polyurea, epoxy resin, polyester, polyurethane, polystyrene and the like. Of course it is not restricted to these materials.

As for the production method thereof, it may be produced according to a normal method for producing a microcapsule. That is, the colored material colored by reacting a leuco dye with a developer or the material allowing to react the colored material with the material (decoloring material) having a decoloring effect by acting on the colored material by acting on at least one of them, which is included as the core material, is incorporated, for example, by (1) a phase separation method from an aqueous solution (which is in practical use most generally, utilizing coacervation of a hydrophilic colloid sol), (2) an interfacial polymerization method (in which a wall membrane is formed by polymerizing a first wall membrane forming material and a second wall membrane forming material, instead of employing a completed polymer from the beginning as a wall membrane material of a microcapsule), (3) a method by suspension polymerization of a monomer in a oil drop (in which a compound having a double bond such as an acrylic-series compound, styrene or vinyl acetate is dissolved in the oil drop and radical polymerization is proceeded by employing a peroxide as a catalyst to generate a polymer insoluble in an oil), and (4) an in-liquid drying method (after a wall membrane material is dissolved in an oil phase and, further, a core material is dispersed in it, the same is poured in a water phase to prepare a droplet, then only the oil phase is evaporated to precipitate the wall membrane by increasing the temperature).

It is preferable to obtain the wall membrane by the "phase separation method from an aqueous solution (coacervation method)" which is general among these methods. The particle diameter of the obtained microcapsule is not particularly specified. It may be a dimension that allows the particle to disperse uniformly in the adhesive without bringing about decrease of the adhesive force as far as possible. Specifically, around 0.1 μm to 1000 μm, preferably 1 μm to 100 μm, and more preferably 5 μm to 20 μm may be usable. In addition, a too hard microcapsule is not destroyed, making it impossible to accomplish the expected purpose and, on the other hand, a too soft one is destroyed during production, transportation or storage to result in a trouble. Destruction thereof by applying a pressure of about 10,000 kPa or less, preferably 200 to 2000 kPa is advantageous.

"The microcapsule including a material (decoloring material) having a decoloring effect by acting on a colored material colored by reacting a leuco dye with a developer and comprising the colored material colored by reacting a leuco dye with a developer in the capsule wall thereof" for use in the invention is a microcapsule comprising the colored material in the capsule wall thereof or a microcapsule whose capsule wall surface is covered with the colored material. Explanation will be given by citing one example. After a colored material liquid prepared by dissolving or dispersing a leuco dye and a developer in an organic solvent and a microcapsule are mixed and stirred, the colored material liquid and the microcapsule are separated, and the colored material having been colored by reacting the leuco dye with the developer is fixed on the microcapsule surface to give a microcapsule comprising the colored material colored by reacting the leuco dye with the developer on the capsule wall.

As for the base material for the pressure-sensitive transfer adhesive tape, those used for a usual adhesive tape may be usable including, for example, a tape of paper or plastic such as polyester, polyethylene, polypropylene or polyethyleneterephthalate, whose surface is treated with a release agent such as silicone, wax or higher alcohol according to need.

The content of the microcapsule in the adhesive is from 0.01 to 200 weight parts per 100 weight parts of adhesive components practically, and 1 to 100 weight parts preferably.

EXAMPLES

More specific description will be given by means of Examples of the invention. However, the invention is not intended to be restricted to these Examples.

Example 1

10 wt parts of crystal violet lactone (made by TOKYO KASEI KOGYO Co., Ltd.) as a leuco dye and 4 wt parts of TG-SA (made by NIPPON KAYAKU CO., LTD.) as a developer were heated and molten with stirring to exhibit a color of blue, which was crushed after standing to cool to give a colored material A.

In addition, a suitable amount of a decoloring material, dimethylamino pyridine which can decolor the colored material A and a microcapsule including isopropyl naphthalene obtained by a coacervation method were dispersed in an acrylic type adhesive to be coated on a base material having been subjected to a delamination treatment to give a pressure-sensitive transfer adhesive tape.

When the tape was transferred to a paper by applying a pressure of 1500 kPa, to what extent the tape had been transferred was easily known because it had a visible blue at that time.

One day after the transfer, when the transferred portion was examined, the portion which had been blue was decolored making it difficult to detect the transferred portion, while maintaining the adhesive force thereof.

Example 2

10 wt parts of Blue-63 (made by YAMAMOTO CHEMICALS Inc.) as a leuco dye and 3.5 wt parts of TG-SA (made by NIPPON KAYAKU CO., LTD.) as a developer were heated and molten with stirring to exhibit a color of blue, which was crushed after standing to cool to give a colored material B.

A suitable amount of the colored material B and dimethylamino pyridine were dissolved in an acrylic type adhesive containing toluene and ethyl acetate as a principal solvent, which was coated on a base material having been subjected to a delamination treatment and whose solvent was dried to give a blue adhesive layer X. Subsequently, a microcapsule including isopropyl naphthalene was obtained by using a coacervation method. A suitable amount of the microcapsule was dispersed in an acrylic type adhesive to be laminated on the adhesive layer X to give a pressure-sensitive transfer adhesive tape.

When the tape was transferred to a paper by applying a pressure of 1500 kPa, to what extent the tape had been transferred was easily known because it had a visible blue at that time.

One day after the transfer, when the transferred portion was examined, the portion which had been blue was decolored making it difficult to detect the transferred portion, while maintaining the adhesive force thereof.

Example 3

10 wt parts of crystal violet lactone (made by TOKYO KASEI KOGYO Co., Ltd.) as a leuco dye and 3.5 wt parts of TG-SA (made by NIPPON KAYAKU CO., LTD.) as a developer were dissolved in a mixed solvent of SOLMIX AP-1 (made by Nihon Arukoru Hanbai K.K.) 120 weight parts and toluene 15 weight parts to give a colored material liquid C.

Further, a microcapsule including a decoloring material, ricinus, was obtained by using an interfacial polymerization method.

Subsequently, 5 weight parts of the microcapsule including ricinus was added to 50 weight parts of the colored material liquid C to be heated to 50° C. and stirred. After 5 minutes, the microcapsule and the colored material liquid C were separated to give a microcapsule whose microcapsule wall was colored by a colored material formed by the leuco dye, crystal violet lactone, and the developer, TG-SA.

A suitable amount of the colored microcapsule was dispersed in an acrylic type adhesive to be coated on a base material having been subjected to a delamination treatment to give a pressure-sensitive transfer adhesive tape. In the Example, the operation of dispersing a suitable amount of the colored microcapsule in the adhesive played the roles of (1) coloring the adhesive layer and (2) incorporating the microcapsule including the decoloring material in the adhesive layer at the same time. Therefore, the operation to prepare the adhesive was very convenient. In other words, it was possible to obtain the intended pressure-sensitive transfer adhesive tape by dispersing the colored microcapsule alone in the adhesive.

When the tape was transferred to a paper by applying a pressure of 1500 kPa, to what extent the tape was transferred was easily known because it had a visible blue at that time.

One day after the transfer, when the transferred portion was examined, the portion which had been blue was decolored making it difficult to detect the transferred portion, while maintaining the adhesive force thereof.

In the drawings reference number 1 denotes a base material; 2 a colored material colored by reacting a leuco dye with a developer; 3 a decoloring material having a decoloring effect by acting on the colored material 2; 4 a microcapsule including a material allowing the aforementioned materials 2 and 3 to react by acting on at least one of them; 5 is a modified microcapsule including a decoloring material having a decoloring effect by acting on a colored material colored by reacting a leuco dye with a developer, which is provided in the wall of the microcapsule; 6 an adhesive layer formed in accordance with the present invention.

From the disclosure given, those skilled in the art will not only understand the present invention and the attendant advantages, but will also find apparent various changes and modifications to the compositions and examples disclosed. It is sought, therefore, to cover all such changes and modifications as within the spirit and scope of the invention, as defined by the appended claims, and equivalents thereof.

What is claimed is:

1. A pressure-sensitive transfer adhesive tape, comprising:
   a) a base material having an adhesive disposed thereon, the adhesive having:
      i) a colored material colored by reacting a leuco dye with a developer;
      ii) a decoloring material having a decoloring effect on the colored material when reacted with the colored material; and
      iii) a plurality of microcapsules containing an allowing material, the allowing material adapted to react with at least one of the colored material and decoloring material to cause the colored material and decoloring material to react with each other to create a decoloring effect on the colored material.

2. The pressure-sensitive transfer adhesive tape of claim 1, further comprising a release agent applied to the base material, wherein the release agent facilitates transfer of the adhesive onto a target surface when pressure is applied to the base material.

3. The pressure-sensitive transfer adhesive tape of claim 2, wherein the release agent includes material selected from the group consisting of silicone, wax and alcohol.

4. The pressure-sensitive transfer adhesive tape of claim 1, wherein the allowing material is released from the microcapsules when a pressure is applied to the microcapsules to cause the microcapsules to rupture.

5. The pressure-sensitive transfer adhesive tape of claim 4, wherein the microcapsules are adapted to rupture when a pressure of about between 200 and 2000 kPa is applied to the microcapsules.

6. The pressure-sensitive transfer adhesive tape of claim 1, wherein the base material is selected from the group consisting of paper, polyester, polyethylene, polypropylene and polyethyleneterephthalate.

7. A pressure-sensitive transfer adhesive tape, comprising:
   a) a base material having adhesive disposed thereon, the adhesive having a plurality of layers, wherein a first layer includes at least one material selected from the group consisting of:
      i) a colored material colored by reacting a leuco dye with a developer;
      ii) a decoloring material having a decoloring effect on the colored material when reacted with the colored material; and
      iii) a plurality of microcapsules containing an allowing material, the allowing material adapted to react with at least one of the colored material and decoloring material to cause the colored material and decoloring material to react with each other to create a decoloring effect on the colored material; and
   b) wherein remaining layers in the plurality of layers include all remaining materials of the group not included in the first layer.

8. The pressure-sensitive transfer adhesive tape of claim 7, wherein the allowing material is released from the microcapsules when a pressure is applied to the microcapsules to cause the microcapsules to rupture.

9. The pressure-sensitive transfer adhesive tape of claim 8, wherein the microcapsules are adapted to rupture when a pressure of about between 200 and 2000 kPa is applied to the microcapsules.

* * * * *